United States Patent
Booth et al.

(10) Patent No.: US 8,054,840 B2
(45) Date of Patent: Nov. 8, 2011

(54) DATA CENTER VIRTUAL LOCAL AREA NETWORK SYSTEM AND METHOD

(75) Inventors: Bruce Booth, Ontario (CA); William B. Chalk, III, Apex, NC (US); David W. Chow, Mundelein, IL (US); Timothy A. Goodacre, Lisle, IL (US); Eric LeBrun, Carros (FR); Gregg W. Machovec, Vestal, NY (US); Joseph Robinson, Cary, NC (US); Atef O. Zaghloul, Morrisville, NC (US); John H. Zeiger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 11/761,848

(22) Filed: Jun. 12, 2007

(65) Prior Publication Data

US 2008/0310422 A1  Dec. 18, 2008

(51) Int. Cl.
*H04L 12/28* (2006.01)
(52) U.S. Cl. .................................. 370/395.53
(58) Field of Classification Search .......... 370/351, 370/395.53; 709/221
See application file for complete search history.

(56) References Cited

U.S. PATENT DOCUMENTS

| | | | |
|---|---|---|---|
| 6,308,205 B1 * | 10/2001 | Carcerano et al. | 709/221 |
| 6,963,575 B1 * | 11/2005 | Sistanizadeh et al. | 370/404 |
| 7,039,687 B1 | 5/2006 | Jamieson et al. | |
| 7,072,346 B2 | 7/2006 | Hama | |
| 7,079,544 B2 | 7/2006 | Wakayama et al. | |
| 7,292,581 B2 * | 11/2007 | Finn | 370/395.53 |
| 7,345,991 B1 * | 3/2008 | Shabtay et al. | 370/221 |
| 2003/0123446 A1 * | 7/2003 | Muirhead et al. | 370/392 |
| 2004/0133619 A1 | 7/2004 | Zelig et al. | |
| 2004/0151181 A1 | 8/2004 | Chu et al. | |
| 2005/0265329 A1 | 12/2005 | Havala et al. | |
| 2006/0165087 A1 | 7/2006 | Page et al. | |
| 2006/0168279 A1 | 7/2006 | Lee et al. | |
| 2006/0176816 A1 | 8/2006 | Roy et al. | |
| 2007/0047536 A1 * | 3/2007 | Scherer et al. | 370/360 |

OTHER PUBLICATIONS

Welcher, Peter, "BGP and MPLS-Based VPNs", Chesapeake NetCraftsmen Senior Consultant's Copyright Article, pp. 1-8, (Oct. 4, 2000).

(Continued)

*Primary Examiner* — Dang Ton
*Assistant Examiner* — Kevin Lee
(74) *Attorney, Agent, or Firm* — Christopher & Weisberg, P.A.

(57) ABSTRACT

A method, system and service for a data center computer network. A core network switches data using a first protocol layer. A first access switch is in electrical communication with the core network. The first access switch communicates the data to the core network using the first protocol layer. A second redundant access switch forms a first access switch pair with the first access switch. The second access switch is in electrical communication with the core network and communicates the data using the first protocol layer. The second access switch is in electrical communication with first access switch and communicates with the first access switch using a second protocol layer. The second protocol layer is at lower OSI level than the first protocol layer. The first access switch and the second access switch are configured to form a first VLAN. A first edge device is in electrical communication with the first access switch and the second access switch. The first edge device is part of the first VLAN.

20 Claims, 3 Drawing Sheets

OTHER PUBLICATIONS

"Solution Brief MPLS Enabling the Next Generation Data Center a Case Study in Future Proof Design" Juniper Networks Copyright Article #351165-001, pp. 1-4, (Jan. 2006).

"Data Center Networking—Architecture and Design Guidelines" Cisco Networkers 2006 Seminar #DC-2501, pp. 1-89, Las Vegas, Nevada (Jun. 18-23, 2006).

Sayeed, Azhar, "CISCO MPLS Enabling Managed Shared Services for Greater Profitability" MPLS for Managed Shared Services Customer Presentation, pp. 1-29, (Jun. 2002).

PCT Notification of Transmittal of the International Search Report and the Written Opinion of the International Searching Authority, or the Declaration dated Feb. 12, 2009.

* cited by examiner

DATA CENTER VIRTUAL LOCAL AREA NETWORK SYSTEM AND METHOD

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to a computer network system and method and, in particular, to a computer system and network providing virtual local area networks ("VLAN") in a data center environment.

BACKGROUND OF THE INVENTION

Service providers of data center computing resources provide a centralized arrangement which allows network and infrastructure resources to be shared among separate customers. This is typically accomplished by providing each customer its own virtual network within the data center. Such may be useful, for example, in an "ecommerce" environment where a service provider implements a data center to provide web server and data server computing resources to multiple customers. As used herein, the term "data center" refers to a facility that is typically secured and is used to provide computing resources, such as web hosting, to different communities of users.

As the need for shared and scalable network computing resources increases, so too does the need for solutions which facilitate scalability in a manner is not disruptive to customers. For example, if the growth of Customer A necessitates the installation of a new web server, current technology may require that data center services for Customers B & C be disrupted or taken off line while the new server for Customer A is installed and the data center network configured to include the new server.

A network can be divided into seven layers according to the known Open System Interconnect ("OSI") model. A Physical layer 1 defines all the electrical and physical specifications for devices. This includes the layout of pins, voltages, and cable specifications. Network adapters and cables are physical-layer devices. A Data link layer 2 provides the functional and procedural means to transfer data between network entities on a LAN (or Virtual LAN) and detect and possibly correct errors that may occur in the Physical layer. Data link layer 2 is the layer at which bridges and switches operate. Connectivity is provided among locally attached network nodes forming Data link layer 2 domains for unicast or broadcast forwarding. A Network layer 3 provides functional and procedural means of transferring variable length data sequences from a source to a destination via one or more networks. Network layer 3 performs network routing functions, and might also perform segmentation and desegmentation, and report delivery errors. Routers operate at Network layer 3, routing data throughout an extended network such as the Internet. Network layer 3 also provides logical addressing and provides end-to-end data transport from the source machine to the destination machine across multiple Data link layer 2 instances. Other OSI Layers transfer data transparently between end users (layer 4), control connections between computers (layer 5), transform data to provide a standard interface (layer 6), and allow a user to access information on the network through an application (layer 7).

A Virtual LAN ("VLAN") is well known today and is implemented by one or more programmed switches such as one or more access switches. A switch is a device that performs transparent bridging, i.e., connection of multiple network segments with forwarding based on MAC addresses. A MAC address is a unique identifier of a respective computing device, and can be "burned-in" to a network interface card of the computing device. Communication of message packets within a VLAN uses OSI Model Data link layer 2 protocol. Data link layer 2 is implemented by hardware and software functions within the switch. To implement a VLAN, the access switch includes a MAC address table for each VLAN which lists which computing device(s) (by MAC address) are logically resident on which interface. An incoming message specifies the MAC address of the target device and is associated with a particular VLAN based on the interface from which it was received. Typically, the switch will look up the address in the MAC address table. If the address is found, the switch will forward the message to the destination through the identified interface. Otherwise, the switch will forward the message through all interfaces associated with the VLAN. All computing devices on the VLAN continually monitor all message packets on their subnet and "listen" for message packets bearing their own MAC address. When a computing device on the VLAN detects a message packet bearing its own MAC address as a destination device, the computing device receives and processes the message packet. Otherwise, the computing device ignores the remainder of the message packet.

Current arrangements and methods for securely and virtually separating multiple customers from their computing resources over a shared local area network (LAN) Ethernet infrastructure has been primarily accomplished through the use of layer 2 and VLAN technologies. Though layer 2 technologies are intended to maintain a loop-free environment (such as through the implementation of spanning-tree algorithms) and offer a flexible stable and secure connectivity approach, layer 2 technologies are limited by their inability to scale as the network infrastructure continues to grow over time. This makes the entire data center network design vulnerable, threatening the overall infrastructure, customer and their resources, and making it less cost effective to support and manage as changes and problems occur. For example, adding a server to a switch and reconfiguring the switch to accommodate the new server as part of a customer's virtual private network ("VPN") can trigger spanning-tree recalculations that impacts other customers. It is therefore desirable to have a data center system that allows for the implementation and expansion of a customer's VPN in a manner that is secure but is not disruptive to other customers. VPNs allow multiple customers to share the same physical network infrastructure while each customer's traffic remains logically separate.

In computer networking and telecommunications, a known Multi Protocol Label Switching ("MPLS") function is a data-carrying function which emulates some properties of a circuit-switched network over a packet-switched network. MPLS operates at an OSI layer that lies between traditional definitions of Data link layer 2 and Network layer 3, but closer to Network layer 3 than Data link layer 2, and therefore, will be considered Network layer 3. MPLS networks benefit from the advantages of OSI layer 3 routing and re-routing in the event of network changes and reconfiguration. However, because of the complexities of configuration and network management, MPLS networks are typically implemented in large-scale wide area networks to provide campus to campus VPNs where changes to customer's networks that would necessitate configuration changes are infrequent. However, the use of a strictly MPLS network in a shared data center environment is expensive and inefficient, and requires a disproportionate amount of personnel because of the frequency of changes in customers' data center requirements. For example, holiday periods may necessitate that customers in the on-line retail business add servers, and then remove those servers when the holiday period is over. Such may also be the case where a web or data server experiences a failure, and a replacement server must be quickly brought on-line. It is therefore desirable to have a data center network system and method that allows the use of OSI layer 3 devices in a manner that does not require frequent configuration and re-configuration of these devices, yet provides the robust routing and VPN environment characteristic of OSI layer 3 networks.

SUMMARY OF THE INVENTION

The present invention advantageously provides a system and method for a data center network that uses OSI layer 2 switching technologies to provide redundant but secure access to the data center core network while using layer 3 switching/routing technologies within the data center to facilitate non-disruptive and scalable changes within a customer's VPN.

In accordance with one aspect, the present invention provides a data center network system in which a core network switches data using a first protocol layer. A first access switch is in electrical communication with the core network. The first access switch communicates the data to the core network using the first protocol layer. A second redundant access switch forms a first access switch pair with the first access switch. The second access switch is in electrical communication with the core network and communicates the data using the first protocol layer. The second access switch is in electrical communication with first access switch and communicates with the first access switch using a second protocol layer. The second protocol layer is at lower OSI level than the first protocol layer. The first access switch and the second access switch are configured to form a first VLAN. A first edge device is in electrical communication with the first access switch and the second access switch. The first edge device is part of the first VLAN.

In accordance with another aspect, the present invention provides a method for a data center network system in which data is switched within a core network using a first protocol layer. A first access switch is used to communicate the data to the core network using the first protocol layer. A second access switch is used to provide a redundant communication path to communicate the data to the core network using the first protocol layer. The second access switch is in electrical communication with the first access switch using a second protocol layer in which the second protocol layer is at a lower OSI level than the first protocol layer.

In accordance with still another aspect, the present invention provides a method for a data center network service in which data communication between a first edge device and a pair of access switches is established. The access switches are in direct electrical communication with each other. The first edge device and the pair of access switches are configured to form a first layer 2 VLAN for a first customer. Data communication between the pair of access switches and a core data center network are established using a layer 3 protocol.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
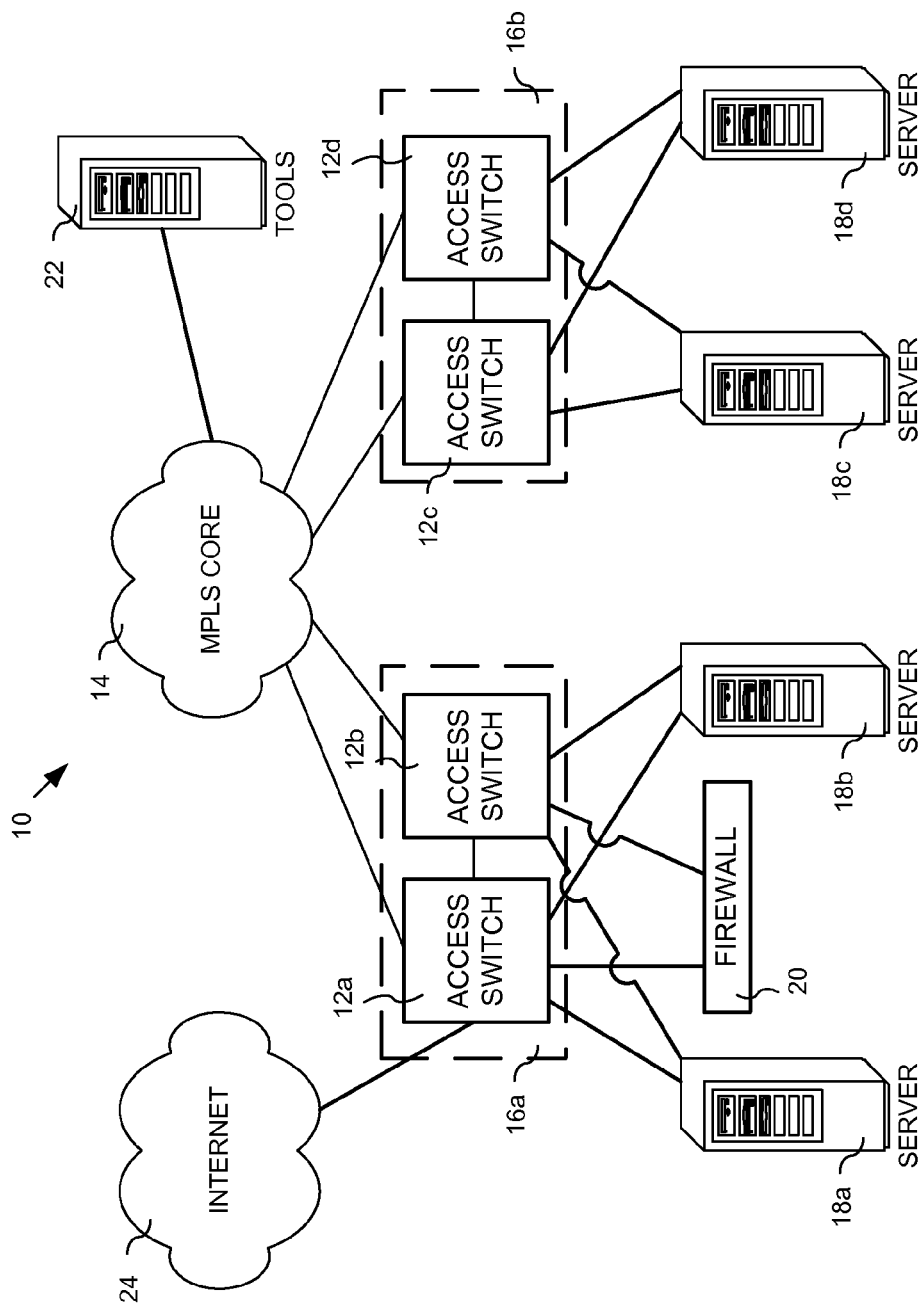
FIG. 1 is a diagram of an exemplary data center VLAN system constructed in accordance with the principles of the present invention.

As an initial matter, it is noted that the terms "routing" and "switching" are used interchangeably herein and refer to the physical or logical switching of data packets from an input to an output. Referring now to the drawing figures in which like reference designators refer to like elements, there is shown in FIG. 1 a diagram of an exemplary data center VLAN system constructed in accordance with the principles of the present invention and designated generally as "10". Data Center VLAN system 10 includes an MPLS core 14 to which is coupled one or more pairs of access switches 12 (shown in FIG. 1 as access switches 12a, 12b, 12c and 12d). Access switches 12 are arranged in pairs so that each access switch 12 within a pair is coupled to the other access switch 12 within the pair, and both access switches 12 are coupled to MPLS core 14. For example, access switch 12a and access switch 12b are in direct electrical communication with one another and both are connected to MPLS core 14. Similarly, access switch 12c is in direct electrical communication with access switch 12d and both access switch 12c and access switch 12d are coupled to MPLS core 14. Access switch pairs that are directly electrically connected are shown in FIG. 1 as access switch pairs 16. For example, access switch 12a and access switch 12b make up access switch pair 16a and access switch 12c and 12d make up access switch pair 16b.

System 10 also includes one or more servers 18, shown in FIG. 1 as server 18a, server 18b, server 18c and server 18d. Servers 18 are connected to one or both access switches 12 within an access switch pair 18. Servers 18a, 18b, 18c and 18d are referred to collectively herein as servers 18. Similarly, access switches 12a, 12b, 12c and 12d are referred to collectively herein as access switches 12 and access switch pairs 16a and 16b are referred to collectively herein as access switches 16.

System 10 can also include one or more firewalls 20 as discussed below in detail. Firewalls 20 are implemented as part of a customer's VPN and are connected to one or both access switches 12 within an access switch pair 16. System 10 can also include a tools server 22 used to configure and manage the components of system 10, including but not limited to the configuration, provisioning and management of servers 18. Access to remote portions of customer's VPNs can be provided via connections to internet 24. Although FIG. 1 shows a single connection to internet 24, it is contemplated that multiple connections to internet 24 can be implemented via multiple access switches 12 within an access switch pair 16, or via multiple access switch pairs, such as switch pairs 16a and 16b. In other words, in the case where multiple customers access internet 24, each customer can have its own physical connection to an access switch 12 or access switch pair 16, or the Data Center as a whole can share access to internet 24.

MPLS core 14 can be implemented, for example, as a pair of MPLS switches in which each access switch 12 is coupled to both MPLS switches for redundancy. Of course, depending on size and scale, multiple pairs (or more than two) MPLS switches can be used. It is contemplated that MPLS switches can be Ethernet switches and switch controllers that include computer hardware and software to implement MPLS layer 3 protocols for routing and communication with access switches 12 as described herein. Arrangements for MPLS layer 3 routing are known and are not described herein. It is understood, that, although the present invention is described with respect to an MPLS core 14, the invention is not limited to such and the use of MPLS herein is for exemplary purposes only. It is contemplated that other network layer 3 routing technologies can be used to support the core routing functions described herein.

Access switches 12 define and implement VLANs for customers, as described in more detail below. MPLS core 14 provides segmentation for implementing higher level services that are shared within system 12 for customer use and maintenance, for example, tools server 22. Access switches 12 can be Ethernet switches that are coupled to MPLS core 14. Although not shown, it is contemplated that servers 18 can be physically included within access switches 12,
i.e., to house customer computing resources such as servers 18. As used herein the term "server" refers not only to computing devices that process and provide information such as web servers, data servers, application servers, and the like, but also to other edge devices such as networked storage devices, including but not limited to network attached storage ("NAS") devices. In other words, from an implementation perspective, it is contemplated that access switch 12 can be implemented as a rack into which "blade" servers are installed and configured for customer use, as needed.

Access switches 12 define and implement VLANs as described in more detail below. Access switches 12 include hardware and software such as central processing units, volatile and non-volatile memory, network interfaces, etc. to implement VLANs and interface with servers 18, as well as the other interconnected components of system 10 shown in FIG. 1. Access switches 12 are configured to logically assign edge devices such as servers 18, firewall 20 and internet 24 connections to VLANs assigned to a customer. Each access switch 12 within an access switch pair 16 communicates data with the other access switch 12 within the access switch pair 16 via an OSI data link layer 2 protocol. In other words, the communication of message packets (also referred to herein as "data") within each VLAN formed by an access switch pair 16 uses OSI data link layer 2 communications. For example, if server 18a and 18b were both assigned to the same customer, access switch 12a and access switch 12b would be configured such that server 18a and server 18b are on the same OSI layer 2 VLAN.

Network interface devices such as firewall 20 can act as an interface for each edge device to its VLAN formed by each access switch 12 within access switch pair 16. Because a pair of access switches 12 provide access to each VLAN in redundant fashion, the failure of a single access switch 12, e.g., switch 12a, does not cause failure of the entire VLAN. Firewall 20 can be attached to each access switch 12 within an access switch pair 16 to enable devices on each access switch to access external resources. For example, as shown and described in detail below, access switch pair 16a can be configured such that access from internet 24 to server 18 is accomplished via firewall 20.

Communication between access switches 12 and MPLS core 14 is implemented using an OSI layer 3 protocol such as MPLS. Under the arrangement of the present invention, communication between edge devices, such as servers 18, and access switches 12 within an access switch pair 16 are implemented using OSI layer 2 protocols while communication between access switches 12 and MPLS core 14 occur at OSI layer 3. This allows the shared data center LAN environment to operate at layer 3 at the core and eliminate any layer 2 dependencies between the data center network core, i.e., MPLS core 14, and the access layer, i.e., access switches 12, while creating a loop-free, secure, and scalable data center core.

The use of a layer 3 routing protocol such as MPLS within core 14 facilitates provisioning and management capabilities at the access switch 12 level where the customer resources and services are provided. As discussed below in detail, this arrangement allows for expansion of customer resources beyond just a single pair of access switches 16 and eliminates the isolated fault issues that exist with data center networks implemented using only OSI layer 2 solutions. The data center network system and method of the present invention reduces the exposure level to customers from a network maintenance scheduling and network-related interruption standpoint due to hardware, software or external factors.

As is shown in FIG. 1, each access switch 12 within an access switch pair 16 are interconnected by a single, i.e., aggregated, layer 2 LAN link. This LAN connection permits edge devices to implement LAN-based redundancy protocols such as network interface card ("NIC") teaming, hot standby routing protocol ("HSRP"), virtual router redundancy protocol ("VRRP"), and the like. Implementation of these technologies and protocols provides transparent recovery from faults, including the failure of an entire access switch 12, e.g., access switch 12a, within an access switch pair 16, e.g., access switch pair 16a.

Figure 2:
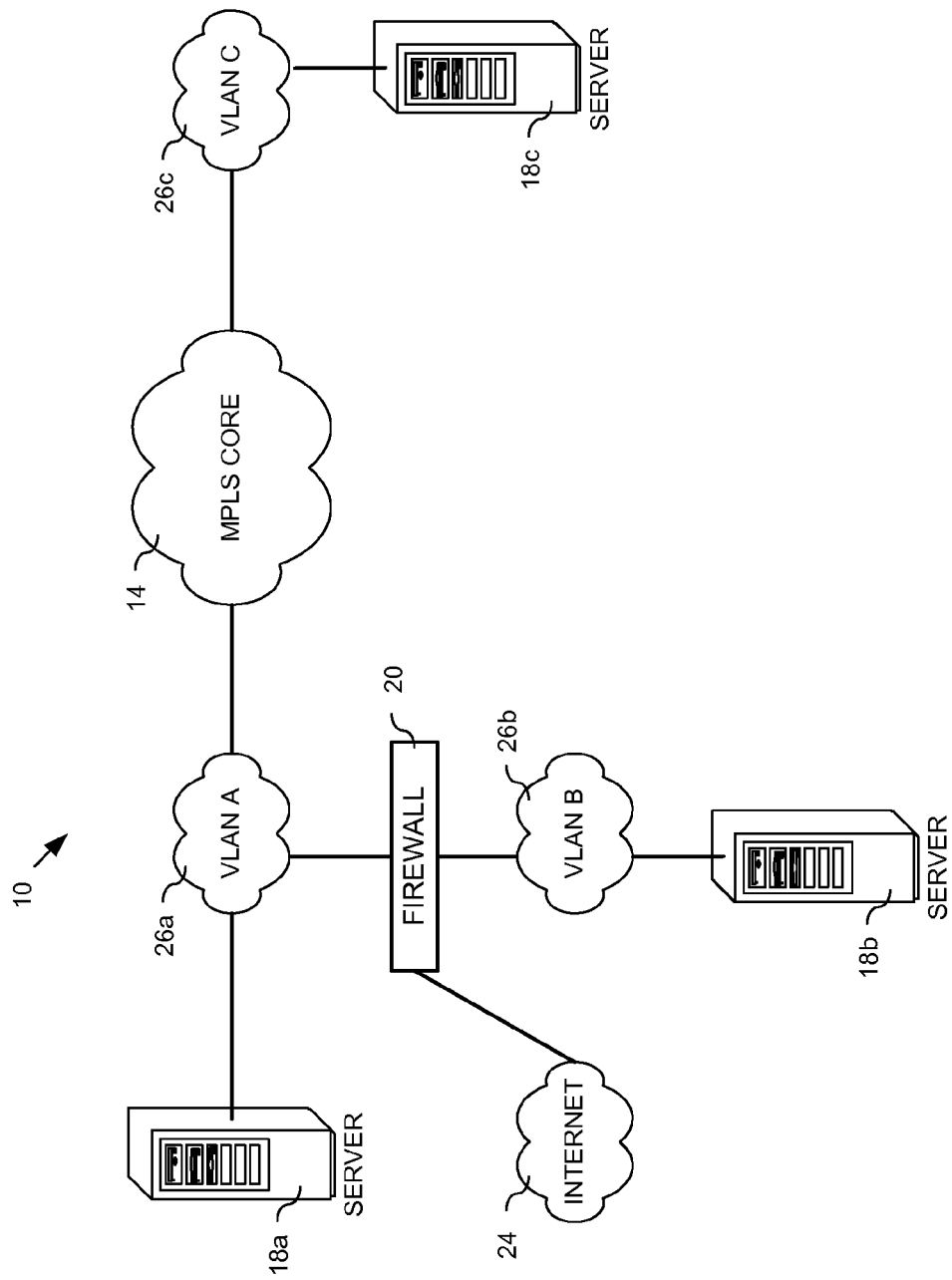
FIG. 2 is a diagram of a logical view of a customer VPN within the data center VLAN system of FIG. 1.

FIG. 2 is a diagram of a logical view of a customer VPN within the data center VLAN system of FIG. 1. As is shown in FIG. 2, for purposes of explaining the present invention, assume that a customer's VPN includes servers 18a, 18b and 18c in which server 18a is part of VLAN A 26a, server 18b is part of VLAN B 26b and server 18c is part of VLAN C 26c (VLAN A 26a, VLAN B 26b and VLAN C 26c are referred to collectively herein as VLANs 26). VLAN A 26a and VLAN B 26b are separated by firewall 20 which is also used to provide access to internet 24. Under this arrangement, communication with other parts of the customer's VPN that reside outside of data center VLAN system 10 are provided via internet 24. Similarly, access for devices outside of the VPN can be provided via internet 24.

For example, if the VPN shown in FIG. 2 was part of a customer's on-line retail site in which server 18a is a web server, server 18b is a data server and server 18c is a second web server, internet users wishing to access the customer's on-line store would obtain this access via the connection from internet 24 to firewall 20. Of note, the use of letter designators such as VLAN "A" 26a is provided for sake of simplicity and ease of understanding, it being understood that numbers and names are typically assigned to VLANs.

As shown in FIG. 2, it is contemplated that VLAN A 26a and VLAN B 26b are configured within each of access switches 12a and 12b within access pair 16a. Under this arrangement, VLAN A 26a and VLAN B 26b are in different subnets, i.e., different internet protocol ("IP") subnets. This arrangement facilitates the use of firewall 20 to provide isolation at the IP level between internet 24, servers 18*a*/18*c* and server 18*b*.

Of note, although the present invention has been described herein in a manner which has access switches within an access switch pair 16*a* communicating using a layer 2 protocol to provide redundant VLANs, it is contemplated that access switches 12 which within an access switch pair 16 can be configured to provide separate VLANs whether to support different customers or, in the case of FIG. 2, to support a single customer communicating through its own edge device, such as firewall 20. In this case, because each VLAN is implemented using a separate layer 3 subnet, in addition to layer 3 routing that can be provided by edge devices such as firewall 20, access switches 12 within an access switch pair 16 also provide a layer 3 routing function between the VLANs, just, as described above, as access switches 12 provide an OSI layer 3 routing function with respect to communication with MPLS core 14. Put another way, access switches 12 within an access switch pair 16 provide a virtual routing and forwarding ("VRF") function in which access switches 12 include multiple instances of layer 3 routing tables. This arrangement increases functionality by allowing network paths to internet 24 and MPLS core 14 to be segmented without the need for each customer to have a dedicated access switch pair 16. In other words, implementation of a VRF within access switches 16 allows customers to share access switch resources while providing separate routing functions for each customer. The VRF provided within access switches 12 allows access switches 12 to act like multiple logical routers to facilitate communication between the different VLANs and/or MPLS core 14.

As can be seen in FIG. 2, the present invention facilitates expansion of a customer's VPN within the data center network 10 in a manner which is not disruptive to other customers and is not significantly disruptive to the affected customer. For example, a customer's VPN may be initially set up using VLAN A 26*a*, VLAN B 26*b*, firewall 20, server 18*a* and server 18*b*. In other words, the initial VPN within data center system 10 includes only those servers and other edge devices configured using access switch pair 16*a*. Such may be the case for a small on-line retailer who uses the data center network VLAN system 10 to provide a single web server and single data server. Under this arrangement, the data center operator can anticipate the growth of the customer's VPN within the data center and can configure MPLS core 14 such that the customer's VPN can be easily expanded to other access switch pairs. Until such expansion is needed, communication amongst the devices on the customer's data center system 10 VPN occurs exclusively through access switch pair 16*a*. In other words, within the initial implementation, access switch 12*a* and access switch 12*b* serve to provide redundant communications between server 18*a* and server 18*b*, i.e., VLAN A 26*a* and VLAN B 26*b* via firewall 20.

If growth of the customer's business, whether based on long term or short term demand, necessitates the implementation of another server, such as a second web server 18*c*, data center network system 10 can be quickly configured to accommodate this growth. As shown in FIGS. 1 and 2, it is assumed that this growth cannot be accommodated on access switch pair 16*a*. Such may occur, for example, because access switch pair 16*a* is full and all available blade servers are assigned and in use. In such case, the additional server, i.e., server 18*c*, is configured using another access switch pair, e.g., access switch pair 16*b* within data center VLAN network 10. As discussed above, such configuration can be facilitated through the use of tools 22 to identify and configure an unused server 18 within system 10. Once configured, server 18*c* is assigned VLAN 26*c*. Because, as discussed above, MPLS core 14 has been pre-configured at the layer 3 level, server 18*c* and VLAN C 26*c* are immediately included as part of the customer's VPN, and communication between server 18*c* and the other edge devices (and internet 24) within the customer's VPN is immediately active.

Of note, although pre-configuration of MPLS core 14 is mentioned, methods for configuring and implementing MPLS networks and tag switching are known and are beyond the scope of the present invention. For example, communication between access switches 12 and MPLS core 14 can be implemented by using an external gateway protocol such as the border gateway protocol ("BGP") while tag switching is used within MPLS core 14 itself.

As it is explained below in detail, access switch pairs 16 and MPLS core 14 are configured to provide different security zones such that there is TCP/IP connectivity between different VLANs that are part of the same security zone. The use of a router redundancy protocol, such as the hot standby router protocol ("HSRP") between pairs of virtual router interfaces provides transparent recovery in the event of network faults, including an outage of an access switch 12. For example, the logical diagram of FIG. 2 shows a single security zone (for example the security zone comprised of VLAN A 26*a* and VLAN C 26*c*) for a single customer.

Figure 3:
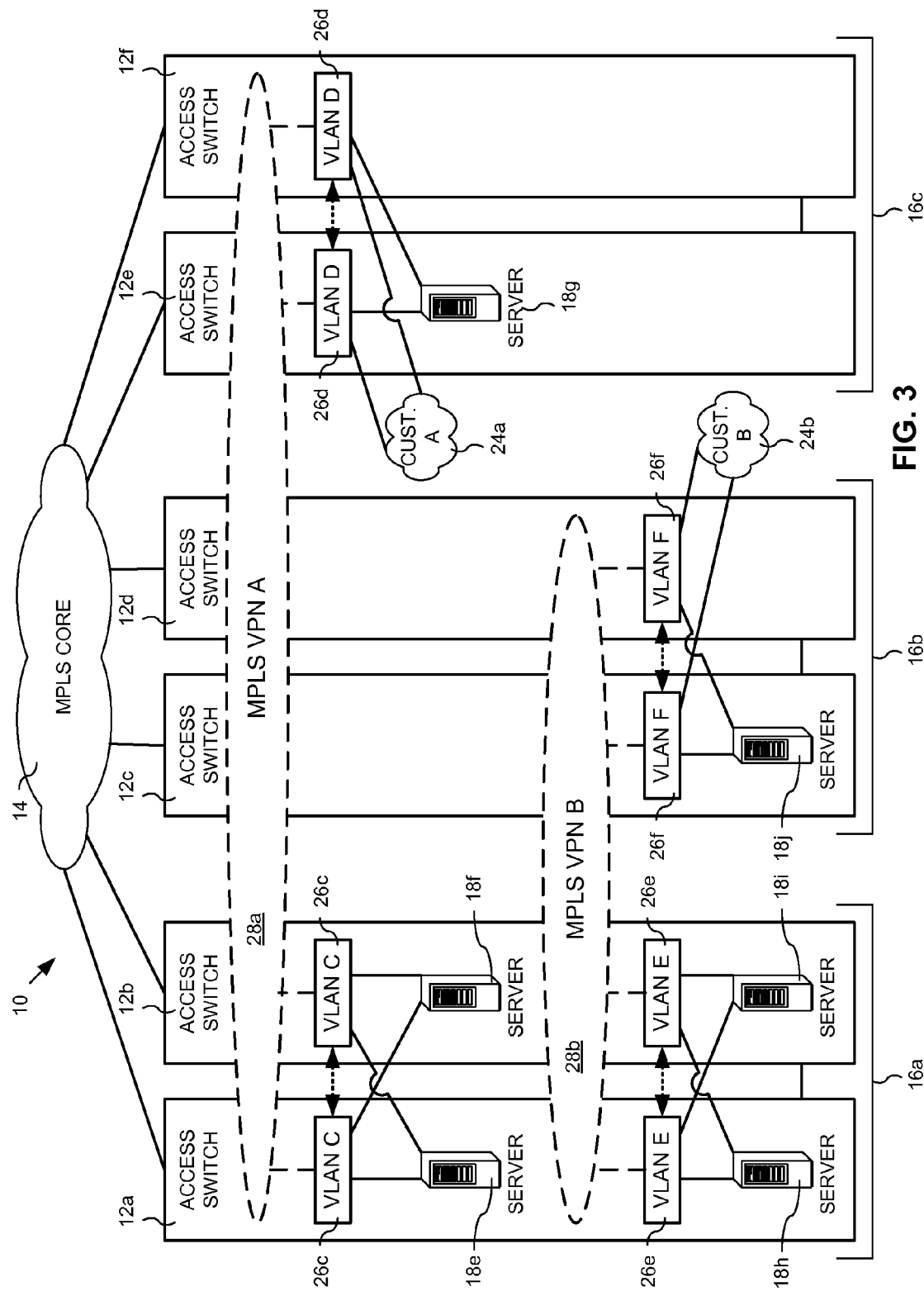
FIG. 3 is a diagram of another exemplary data center VLAN system constructed in accordance with the principles of the present invention showing separation between customer VLANs.

Security zones and the implementation and support of multiple customers within a data center VLAN network system 10 of the present invention is described with reference to FIG. 3. FIG. 3 shows two separate security zones for two separate data center customers, namely the security zone created via MPLS VPN A 28*a* and the security zone created via MPLS VPN B 28*b*. MPLS VPN A 28*a* is implemented across three access switch pairs 16*a*, 16*b* and 16*c* (including access switches 12*a*, 12*b*, 12*c*, 12*d*, 12*e* and 12*f*). MPLS VPN B 28*b* is implemented across access switch pairs 16*a* and 16*b*. Of course, the two security zones and MPLS VPNs shown in FIG. 3 are merely exemplary, it being understood that any number of VPNs can be implemented within a data center and can be distributed across any quantity of access switch pairs 16 subject to the physical limitations of the data center and the size and processing ability of MPLS core 14.

The security zone created by MPLS VPN A 28*a* includes VLAN C 26*c* configured on access switch pair 16*a* and VLAN D 26*d* configured on access switch pair 16*c*. Servers 18*e* and 18*f* are part of VLAN 26*c* while server 18*g* is included as part of VLAN D 26*d*. Access to or from users of customer A's VPN is provided through customer A internet connection 24*a*.

As is described herein, the separate security zone for separate customer B is provided by MPLS VPN B 28*b*. MPLS VPN B 28*b* supports VLAN E 26*e* configured on access switch pair 16*a* and VLAN F 26*f* configured on access switch pair 16*b*. Servers 18*h* and 18*l* are supported by VLAN E 26*e* and server 18*j* is provided on VLAN F 26*f*. Access to and from customer B users is provided via internet connection 24*b*. Of note, internet 24*a* and internet 24*b* are referred to collectively herein as internet 24, it being understood that as discussed above, access to internet 24*a* and access to internet 24*b* can take the form of separate physical connections or one physical connection logically divided to support the two separate customers.

The dotted lines with arrowheads at both ends refers to layer 2 LAN trunks. Solid lines refer to physical connections and dashed connecting lines refer to layer 3 MPLS LAN VPN connections. In other words, FIG. 3 shows access switch pair 16 connected to MPLS 14 in a physical manner as well as each access switch 12 within an access switch pair being physically connected, while each MPLS VPN is provided across MPLS core 14 using access switches 12.

As is shown in FIG. 3, MPLS VPN A 28a provides a secure virtual routing network for customer A while MPLS VPN B 28b provides a secure virtual routing network for customer B. This is accomplished while still providing layer 2 connectivity between servers 18 attached to the same access switch pair 16. With respect to implementation, the IP address space for customer A on MPLS VPN A 28a is completely independent of the IP address space used to implement MPLS VPN B 28b for customer B. As such, both customers can have overlapping IP addresses because of the virtual routing and forwarding functions implemented in access switches 12. The virtual routing and forwarding function allows network traffic for each customer to be secure and isolated from the traffic for other customers. In addition, as discussed above, the implementation of an additional server for a customer is quickly and easily accomplished.

The present invention advantageously provides a system and method which, when implemented in a data center environment, allows secure VPNs to be implemented for different customers in a manner which allows for the non-disruptive change of edge devices within the VPN. The use of layer 2 protocols at the access switch layer allows the provisioning of redundant access for the edge devices in a manner which does not create massive spanning tree recalculation (and hence disruptive) problems when edge devices are added and/or an access switch 12 experiences a failure. However, the use of a layer 3 protocol, such as MPLS, at the core of the data center network allows for the creation of layer 3-based VPNs which can be preconfigured at the core level to facilitate configuration changes at the edge device level. Put another way, VPNs can be configured at the edge level without further configuration changes at the core device level. Redundant access between access switches 12 and MPLS core 14 further provides non-looping redundant access via a virtual hub and spoke arrangement such that the failure of an MPLS core router or link connecting an access switch 12 to an MPLS core 14 router is quickly accommodated and network communications within an MPLS VPN are minimally, if at all, disrupted.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A data center computer network system comprising:
a core network, the core network including switches and switching data using a first protocol layer;
a first access switch in communication with the core network, the first access switch communicating the data to the core network using the first protocol layer;
a second access switch forming a first access switch pair with the first access switch, the second access switch in communication with the core network and communicating with the core network using the first protocol layer;
a first link that couples the first access switch and the second access switch and enables communication between the first access switch and the second access switch using a second protocol layer, the second protocol layer being at a lower Open Systems Interconnection (OSI) level than the first protocol layer;
a first Virtual Local Area Network (VLAN) including the first access switch and the second access switch;
a table stored in each of the first access switch and the second access switch, the first access switch and the second access switch using the corresponding table to forward data between the first VLAN and the core network;
the core network being pre-configured based on the first protocol layer to support configuration changes in the second protocol layer of a plurality of Virtual Private Networks (VPNs) such that the core network does not have to be reconfigured in response to the configuration changes in the second protocol layer; and
the first VLAN being part of a first VPN of the plurality of VPNs.

2. The computer network system of claim 1, further comprising:
a third access switch in electrical communication with the core network, the third access switch communicating the data to the core network using the first protocol layer;
a fourth access switch forming a second access switch pair with the third access switch, the fourth access switch in electrical communication with the core network and communicating the data using the first protocol layer, and the fourth access switch in electrical communication with the third access switch and communicating the data using the second protocol layer, the third access switch and the fourth access switch being configured to form a second VLAN; and
a second edge device in electrical communication with the third access switch and the fourth access switch, the second edge device being part of the second VLAN: and the second VLAN being part of the first VPN.

3. The computer network system according to claim 2, further comprising a third edge device in communication with the first access switch and being part of a third VLAN, and a fourth edge device in communication with the third access switch, the fourth edge device being part of a fourth VLAN, the first VLAN and the second VLAN are associated with a first customer and the third and fourth VLAN are associated with a second customer, wherein data and routing information associated with the first customer are not accessible by the second customer and data and routing information associated with the second customer are not accessible by the first customer; and
the third and fourth VLAN being part of a second VPN.

4. The computer network system according to claim 2, wherein communication between the first VLAN and the second VLAN is via the core network.

5. The computer network system according to claim 4, wherein each of the first, second, third and fourth access switches perform a virtual routing and forwarding function to control data packet routing and forwarding between a corresponding first, second, third and fourth access switch and the core.

6. The computer network system according to claim 1, wherein the first protocol layer supports Multiprotocol Label Switching (MPLS).

7. The computer network system according to claim 1, wherein the second protocol layer supports Ethernet.

8. The computer network system according to claim 1, further comprising a first edge device in communication with the first access switch and the second access switch, the first edge device is a firewall.

9. The computer network according to claim 1, wherein the first access switch and the second access switch perform a virtual routing and forwarding function to provide separate routing and forwarding for each of a plurality of customers.

10. A method for a data center network system, the method comprising:
using a first protocol layer to switch data within a core network;
providing a first access switch to communicate the data to the core network using the first protocol layer;
providing a second access switch to communicate the data to the core network using the first protocol layer;
coupling the first access switch and the second access switch using a second protocol layer;
providing a first edge device to communicate with the first access switch and the second access switch;
forming a first Virtual Local Area Network (VLAN) using the first edge device, the first access switch and the second access switch;
forming a connection whereby both the first access switch and the second access switch are connected to the first edge node;
using a second protocol layer to enable communication between the first edge device, the first access switch and the second access switch, the second protocol layer being at a lower OSI level than the first protocol layer;
accessing a table stored in each of the first access switch and the second access switch to forward data between the first VLAN and the core network:,
pre-configuring the core network based on the first protocol layer to support configuration changes in the second protocol layer of a plurality of Virtual Private Networks (VPNs) such that the core network does not have to be reconfigured in response to the configuration changes in the second protocol layer; and
the first VLAN being part of a first VPN of the plurality of VPNs.

11. The method according to claim 10, wherein the second protocol layer supports Ethernet.

12. The method according to claim 10, wherein the first protocol layer supports Multiprotocol Label Switching (MPLS).

13. The method according to claim 10, further comprising performing a virtual routing and forwarding function to provide separate routing and forwarding for each of a plurality of customers.

14. A method for data center network service, the method comprising:
establishing data communication between a first edge device and a pair of access switches, the pair of access switches being in direct communication with each other and the first edge device;
configuring the pair of access switches to form a first layer 2 Virtual Local Area Network (VLAN) for a first customer;
assigning the first edge device to the first layer 2 VLAN;
establishing data communication between the pair of access switches and a core data center network using a plurality of layer 3 protocol routing table instances, the pair of access switches providing redundancy within the first layer 2 VLAN by their connection to the first edge device, the pair of access switches each in communication with a first pair of core switches of the core data center network;
pre-configuring the core network based on layer 3 protocol to support configuration changes in layer 2 protocol of a plurality of Virtual Private Networks (VPNs) such that the core network does not have to be reconfigured in response to the configuration changes in layer 2 protocol; and
the first VLAN being part of a first VPN of the plurality of VPNs.

15. The method according to claim 14, further comprising establishing data communication between a second edge device and the pair of access switches, the second edge device and the pair of access switches being configured to form a second layer 2 VLAN for a second customer.

16. The method according to claim 14, wherein the layer 3 protocol is Multiprotocol Label Switching (MPLS) and the layer 2 VLAN is Ethernet.

17. The method according to claim 16, further comprising using a tool server in communication with the core network to configure the first edge device.

18. The method according to claim 16, further comprising maintaining communication between the core network and the edge device if one of the pair of access switches fails.

19. The method according to claim 15, wherein the first VPN is a first Multiprotocol Label Switching (MPLS) VPN and the second VLAN is part of a second MPLS VPN for the second customer, the first MPLS VPN and the second MPLS VPN being logically separate from one another.

20. The method according to claim 19, wherein the pair of access switches perform a first virtual routing and forwarding function for the first MPLS VPN and a second separate virtual routing and forwarding function for the second MPLS VPN.

* * * * *